(12) United States Patent
Krall et al.

(10) Patent No.: US 6,471,907 B1
(45) Date of Patent: Oct. 29, 2002

(54) SHUTTLE-TYPE BLOW MOLDING METHOD AND APPARATUS

(75) Inventors: Thomas J. Krall; Michael J. Lonsway, both of Toledo, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 41 days.

(21) Appl. No.: 09/737,106

(22) Filed: Dec. 14, 2000

(51) Int. Cl.[7] ............ B29C 49/04; B29C 49/30; B29C 49/24

(52) U.S. Cl. .............. 264/509; 264/527; 264/540; 264/542; 425/503; 425/532; 425/538; 425/539

(58) Field of Search .................. 264/540, 542, 264/509, 527; 425/532, 538, 539, 503

(56) References Cited

U.S. PATENT DOCUMENTS

| | | | | |
|---|---|---|---|---|
| 2,861,295 A | * | 11/1958 | Hagen et al. ............... | 425/532 |
| 3,111,711 A | * | 11/1963 | Colombo .................... | 425/532 |
| 3,235,907 A | * | 2/1966 | Harwood et al. ........... | 425/532 |
| 3,396,427 A | * | 8/1968 | Raspante .................... | 264/540 |
| 3,456,290 A | * | 7/1969 | Ruekberg .................... | 264/540 |
| 3,614,807 A | | 10/1971 | Lagoutte .................... | 425/532 |
| 3,635,636 A | * | 1/1972 | Lagoutte .................... | 425/532 |
| 3,652,751 A | * | 3/1972 | Criss et al. ................. | 264/542 |
| 3,685,938 A | * | 8/1972 | Lagoutte .................... | 425/539 |
| 3,718,724 A | * | 2/1973 | Holzmann et al. ......... | 264/542 |
| 3,998,576 A | * | 12/1976 | Frohn et al. ................ | 425/532 |
| 4,601,869 A | | 7/1986 | Harry et al. ................ | 264/523 |
| 4,708,630 A | * | 11/1987 | Hammond .................. | 264/509 |
| 4,769,205 A | | 9/1988 | Oles et al. .................. | 264/509 |
| 5,284,432 A | | 2/1994 | Wurzer ....................... | 425/532 |
| 5,576,034 A | | 11/1996 | Kiefer et al. ............... | 425/532 |
| 5,855,838 A | | 1/1999 | Weber et al. ............... | 264/509 |

* cited by examiner

*Primary Examiner*—Robert Davis

(57) ABSTRACT

Shuttle blow molding apparatus having an extruder or a blow head for substantially continuously emitting a thermoplastic material in tubular or parison form at a moldable temperature downwardly along a vertical axis. A finite length of the thermoplastic material is grasped by a first mold set, which then moves downwardly with respect to the extruder or blow head to provide clearance for a second mold set to move to a position to grasp a second finite length of the emitted thermoplastic. The first mold set is then moved horizontally away to permit the emitted thermoplastic length therein to be blown into a hollow article, and thereafter removed from the first mold set that is permitted to return and engage an other finite length of the thermoplastic material. The second mold set follows the first mold set in a path of travel traced by the first mold set. A single in-mold labelling device can be provided to sequentially apply labels to the interior of the mold sets, while the mold sets are open, for application to the articles being blown in the mold sets.

9 Claims, 15 Drawing Sheets

SHUTTLE-TYPE BLOW MOLDING METHOD AND APPARATUS

FIELD OF THE INVENTION

This invention relates to a method of, and apparatus for, blow molding hollow articles of a thermoplastic material. More particularly, this invention relates to a method of, and apparatus for, blow molding hollow containers of a thermoplastic material.

BACKGROUND OF THE INVENTION

The production of thermoplastic containers by shuttle blow molding is described, for example, in U.S. Pat. No. 3,614,807 (Lagoutte). In shuttle blow molding, two or more sets of blow molds, each of which is made up of a pair of mold halves that open and close relative to each other, are moved, in sequence, to engage an extruded tube of thermoplastic material at a moldable temperature, or a spaced apart plurality of such tubes in equipment used to simultaneously manufacture a plurality of containers in each mold set. Each mold set is then moved laterally away to a station where the portion of the tube in the mold set is blown into its desired configuration, as determined by the configuration of a cavity that is defined by the halves of the mold set, the lateral movement of each mold set often involving a first motion coaxial with the extruded tube to stretch the tube to properly size it and/or to axially orient material therein. The halves of the mold set are then opened to permit removal of the blown article, and the mold set is then returned to grasp another section of the extruded tube or tubes for a repeat of the process. The mold sets of a given shuttle blow molding machine move in predetermined paths relative to one another so that sequential portions of the-extruded tube are usually grasped by one or another of the mold sets, without the need to employ intermittent extrusion of the thermoplastic tube or tubes.

In the manufacture of containers by shuttle blow molding it has become popular to apply labels to the containers, by introducing a label or an opposed pair of labels into the open molds before the preforms or parisons are engaged thereby, by equipment that applies labels to the interiors of the open mold halves, and this equipment is generally described as in-mold labelling equipment. Known types of in-mold labelling equipment have the capacity to feed labels to the mold sets of a shuttle blow molding machine at a rate equal to the total of the production rates of all mold sets of the shuttle blow molding machine. Unfortunately, however, known types of shuttle blow molding machines position the various mold sets at different positions from one another while containers are being blown therein. This, then, requires an in-mold labelling machine for each mold set, notwithstanding that the total capacity of the multiple in-mold labelling machines for a given shuttle blow molding machine far exceeds the molding capacity of all the mold sets of the machines. The use of an in-mold labelling machine in connection with a shuttle blow molding machine is described, for example, in U.S. Pat. No. 4,769,205 (Oles et al.).

Another disadvantage of known types of shuttle blow molding machines that applies even when the machine is not being used to apply labels to the containers in the mold is that article removal equipment must be provided for each mold set, because the article removal positions of the various mold sets differ from one another.

SUMMARY OF THE INVENTION

Shuttle blow molding apparatus according to the present invention is made up of an extruder that continuously, vertically downwardly extrudes a tube, or a plurality of spaced apart tubes, or a blow head that continuously produces parisons of containers, along a vertically downwardly extending path. The extruded tube or parison is made up of thermoplastic material at a suitable temperature for blow molding into a useful article, or articles, such as a container, or containers, of the type used in a wide variety of packaging applications. The shuttle blow molding apparatus also includes pair of mold sets, or a superimposed plurality of pairs of mold sets, each set being made up of an opposed pair of mold halves that close and open with respect to each other, and the inside surfaces of the mold halves are configured so that the mold halves, when closed, define a cavity, or a plurality of cavities in the case of apparatus having a multi-tube extruder, in which an article is blown from a length of extruded tube to conform to the configuration of a cavity.

The shuttle blow molding apparatus of the present invention also includes apparatus for moving each mold set, in sequence, to an elevated position in which it grasps a length of extruded tube and then downwardly to permit another mold set to engage another length of extruded tube, with some stretching of the extruded tube, if desired, being done during the downward motion of a mold set. Preferably, the first mold set remains in engagement with the extruded tube until the second mold set engages the tube for controlled stretching of the tube for optimum material distribution and for more accurate positioning of the extruded tube until it is engaged by the second mold set.

In any case, after each mold set has reached a lower position, it is moved laterally, and preferably along a downward incline, to permit the section of the tube in the mold set, whose halves are now closed, to be blown into the intended article. At the conclusion of the blowing operation, the mold set, now no longer vertically aligned with the extruder, is moved upwardly to the elevation at which it will grasp another length of tube for a repeat of the cycle, but still out of vertical alignment with the extruder. At this position, the halves of the mold set are opened and the blown article(s) removed, whereupon the mold set is moved horizontally back to its start position to grasp another length of tube to begin a repeat of the cycle. In this manner, each mold set discharges molded articles at the same location, and only one set of take-off equipment is required for each multiple mold set shuttle blow molding apparatus.

When desired, a single in-mold labelling device may be used to apply labels to the interiors of the mold sets in which each of the parisons in a series are extruded before the parisons are blown into containers by the mold sets of a shuttle blow molding apparatus according to the present invention. In this case it is only necessary to begin the process with a slightly pre blown parison that is emitted by a die head into which compressed air, in addition to molten plastic, is introduced. Alternatively, the shuttle blow molding apparatus according to the present invention is adaptable to the manufacture of tandem containers in which each tandem is made up of a pair of containers, each of which is joined open end to open end, which is popular for the manufacture of relatively small containers, for example, six ounce containers. The shuttle blow molding apparatus according to the present invention is also adapted to the manufacture of large containers with integral handles, and it is adapted to the manufacture of containers with precisely calibrated, closure-receiving finishes.

Accordingly, it is an object of the present invention to provide an improved method of, and apparatus for, producing hollow articles of a thermoplastic material in multiple mold sets that move, in sequence, in closed paths relative to an extruder. More particularly, it is an object of the present invention to provide a method and apparatus of the foregoing character in which finished articles can be removed from each of the mold sets at only a single position. It is also an object of the present invention to provide a method and apparatus of the foregoing character in which labels can be applied to the interiors of open mold sets at a single location prior to the blowing of parisons into containers in the mold sets.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
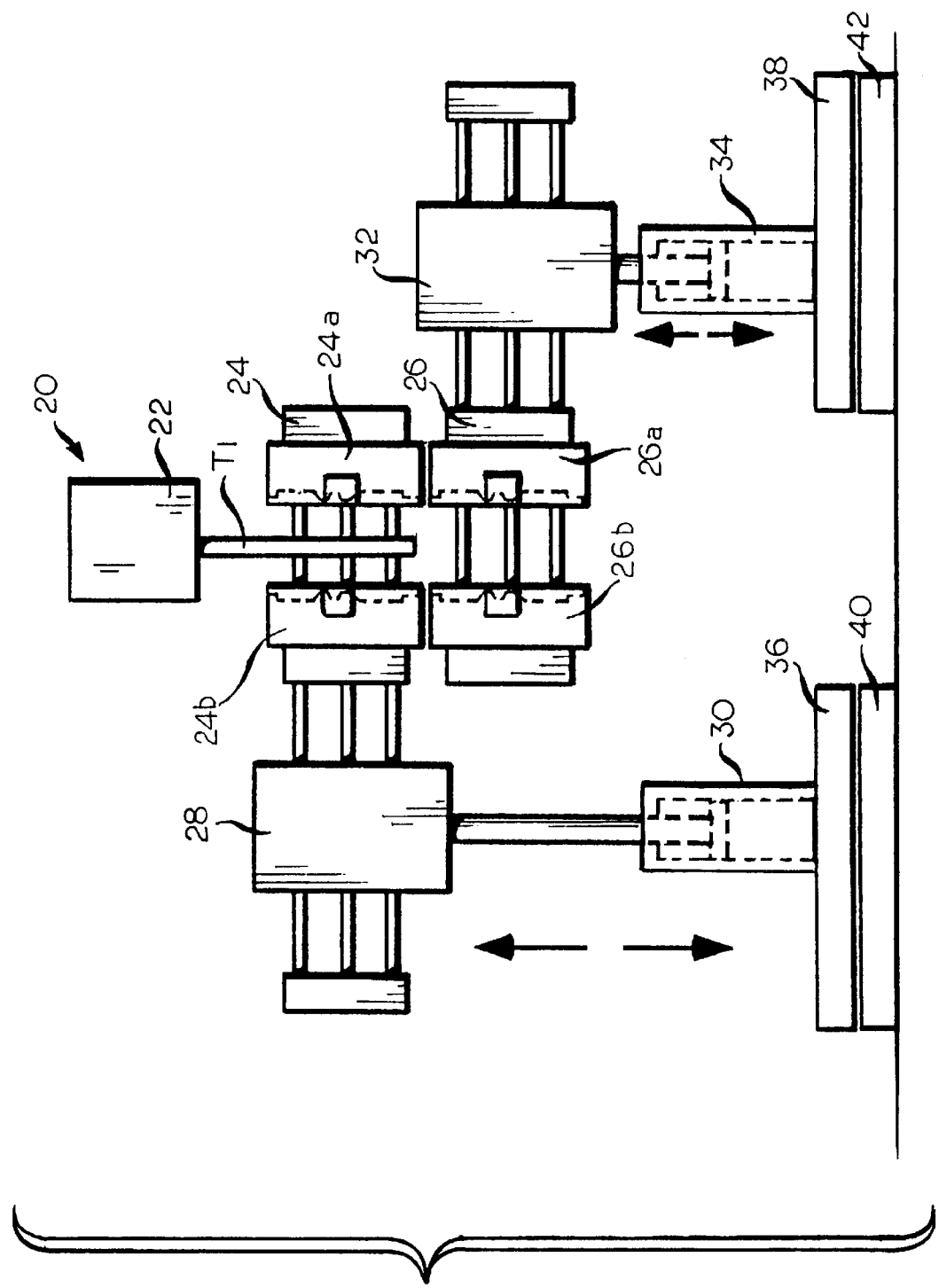
FIG. 1 is a front elevational view of apparatus according to the present invention for producing blown articles of a thermoplastic material.
Figure 2:
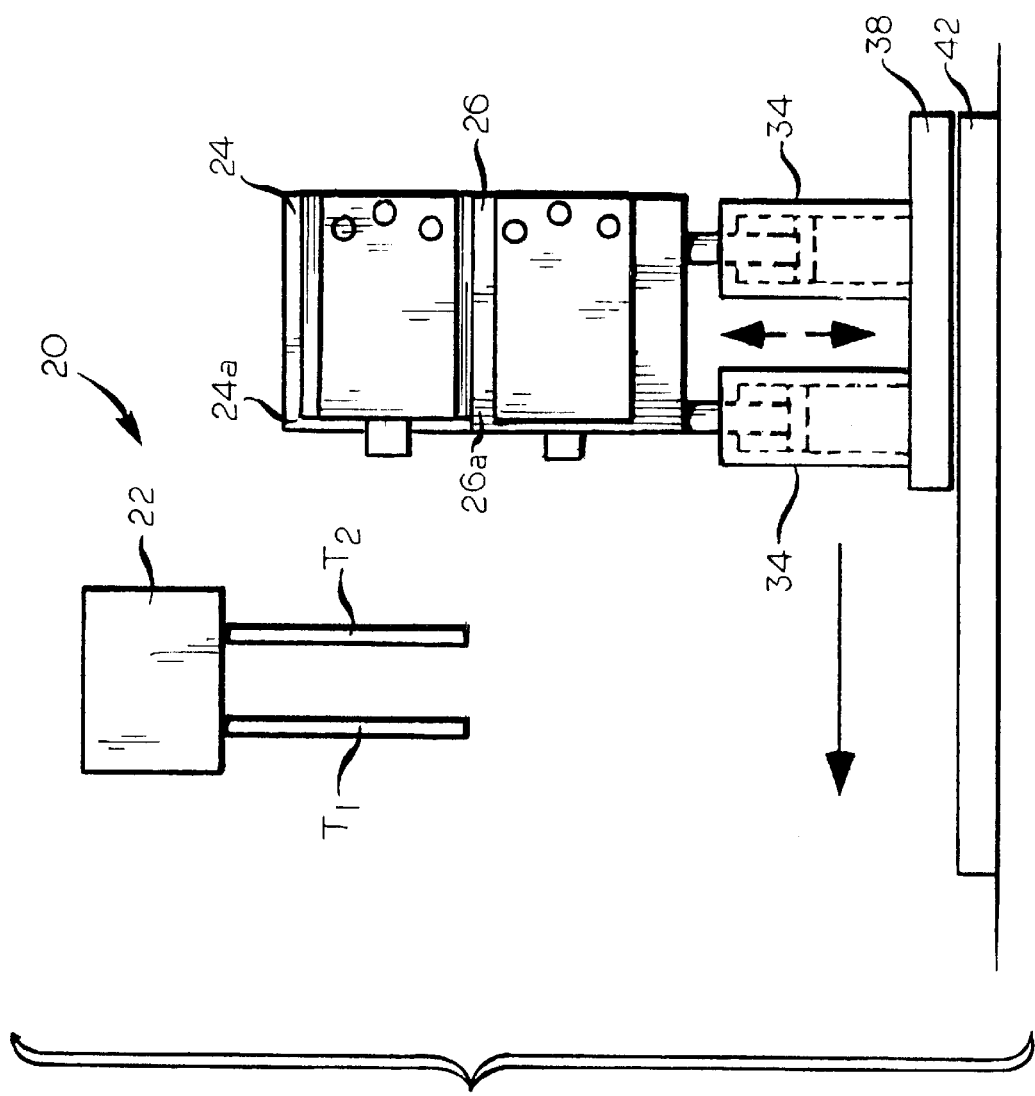
FIG. 2 is a side elevational view of the apparatus of FIG. 1.

Shuttle blow molding apparatus according to the present invention is indicated generally by reference numeral 20 in FIGS. 1 and 2. The apparatus 20 includes an extruder 22 that substantially continuously downwardly extrudes a spaced apart pair of tubes T1, T2 of thermoplastic material at a temperature sufficiently high to permit finite lengths of such tube to be blown into containers or other useful hollow articles. The blowing of successive lengths of each of the tubes T1, T2 is done sequentially by a pair of mold sets 24, 26, which may be of conventional construction. Each mold set 24 is made up of a pair of mold halves 24a, 24b, which open and close with respect to one another to define, when closed, mold cavities in which lengths of the tubes T1, T2 are blown into the desired articles. Likewise, each mold set 26 is made up of a pair of mold halves 26a, 26b, which open and close with respect to one another to define, when closed, mold cavities in which successive lengths of the tubes T1, T2 are blown into the desired articles. While the simultaneous molding of articles from tubes T1, T2 is described, it is to be understood that it is contemplated that the apparatus 20 can be used to produce only one article at a time from a single extruded tube, or multiple articles from each tube and to produce one or more articles at a time from each of three or more extruded tubes.

The mold set 24 is mounted on a frame 28 for reciprocating motion in a horizontal plane, and the frame 28 is mounted on one or more vertical cylinders 30 for reciprocating motion in a vertical plane. Similarly, the mold set 26 is mounted on a frame 32 for reciprocating motion in a horizontal plane, and the frame 32 is mounted on one or more vertical cylinders 34 for reciprocating motion in a vertical plane. The cylinders 30 and the cylinders 34 are mounted on carriages 36, 38, respectively, and the carriages 36, 38 are mounted for reciprocating horizontal motion on slides 40, 42, respectively.

FIGS. 1 and 2 illustrate a step in the operation of the apparatus 20 in which the mold set 24 is open and is positioned sufficiently high to engage freshly extruded finite lengths of the tubes T1, T2, but out of horizontal alignment with the tubes T1, T2, and the mold set 26 is positioned immediately below the mold set 24 and is open, after removal of blown articles therefrom. Then, the mold set 24 is moved horizontally, to the left from the portion shown in FIG. 2, to the position shown in FIG. 1 to engage the finite lengths of the tubes T1, T2, and the mold set 26 is moved upwardly to the position previously occupied by the mold set 24.

After the mold set 24 engages and clamps the lengths of the tubes T1, T2, it moves downwardly to stretch the lengths of the tubes T1, T2 engaged therein, and to blow such lengths into containers or other articles by the introduction of blowing air into the molds of the mold set 24 by means, not shown. At this time, the mold set 26 is also moved horizontally to engage subsequent finite lengths of the tubes T1, T2, preferably while the tubes T1, T2 are still engaged by the mold set 24, and the mold set 24 is then moved horizontally to a take-off position at its lowermost elevation permitted by the cylinders 30 to permit blown containers to be removed therefrom, and is then returned to its uppermost position out of alignment with the tubes T1, T2 to be ready to again move to grasp finite lengths of the tubes T1, T2 after the mold set 26 has been lowered to make way for the mold set 24 to move into alignment with the extruder 22. Preferably, the motions of the mold sets 24, 26 from lowermost positions in alignment with the extruder 22 to positions out of alignment with the extruder 22 will be at a somewhat downwardly inclined angle to assist in severing of the finite tube lengths in the lowermost mold set from those in the uppermost mold set.

It is to be noted that the take-away location for the blown articles in the mold set 26 is exactly the same as that for the blown articles in the mold set 24, namely, the position occupied by the mold set 26 in FIG. 2. Thus, the apparatus 20 does not require multiple sets of article removal equipment, notwithstanding that it employs multiple mold sets in the manufacture of plastic articles. Further, it is to be understood that the apparatus 20 may be used to manufacture plastic articles with three or more mold sets, notwithstanding that only two such mold sets are shown in FIGS. 1 and 2.

In the embodiment of FIGS. 3–8, elements that correspond to the elements of the embodiment of FIGS. 1 and 2 are identified by a 100 series numeral, the last two digits of which correspond to the two digits of the corresponding element of the embodiment of FIGS. 1 and 2.

Shuttle blow molding apparatus according to the embodiment of the invention illustrated in FIGS. 3–8 is indicated generally by reference numeral 120, and the apparatus 120 includes an extruder 122 that substantially continuously downwardly extrudes a spaced apart pair of tubes T1, T2 of thermoplastic material at a temperature sufficiently high to permit finite lengths of such tubes to be blown into containers or other useful articles. The blowing of successive lengths of each of the tubes T1, T2 is done sequentially by a pair of mold sets 124, 126, which may be of conventional construction. The mold sets 124, 126, differ from the mold sets 24, 26 of the embodiment of FIGS. 1 and 2, respectively, in that each of the mold sets 124, 126 is suited for the manufacture of blown containers in tandem, that is, a pair of blown containers being simultaneously molded in each mold cavity and joined to each other open end to open end. In any case, the mold set 124 is also provided with bottom molds 124c, 124d, and the mold set 126 is also provided with bottom molds 126c, 126d. The motion of the mold sets 124, 126 through the various portions of the closed cycles that they move through, as will be hereinafter explained more fully, may be actuated by equipment, not shown, corresponding to the equipment used to move the mold sets 24, 26 of the embodiment of FIGS. 1 and 2 through the various steps of their motion cycles.

Figure 3:
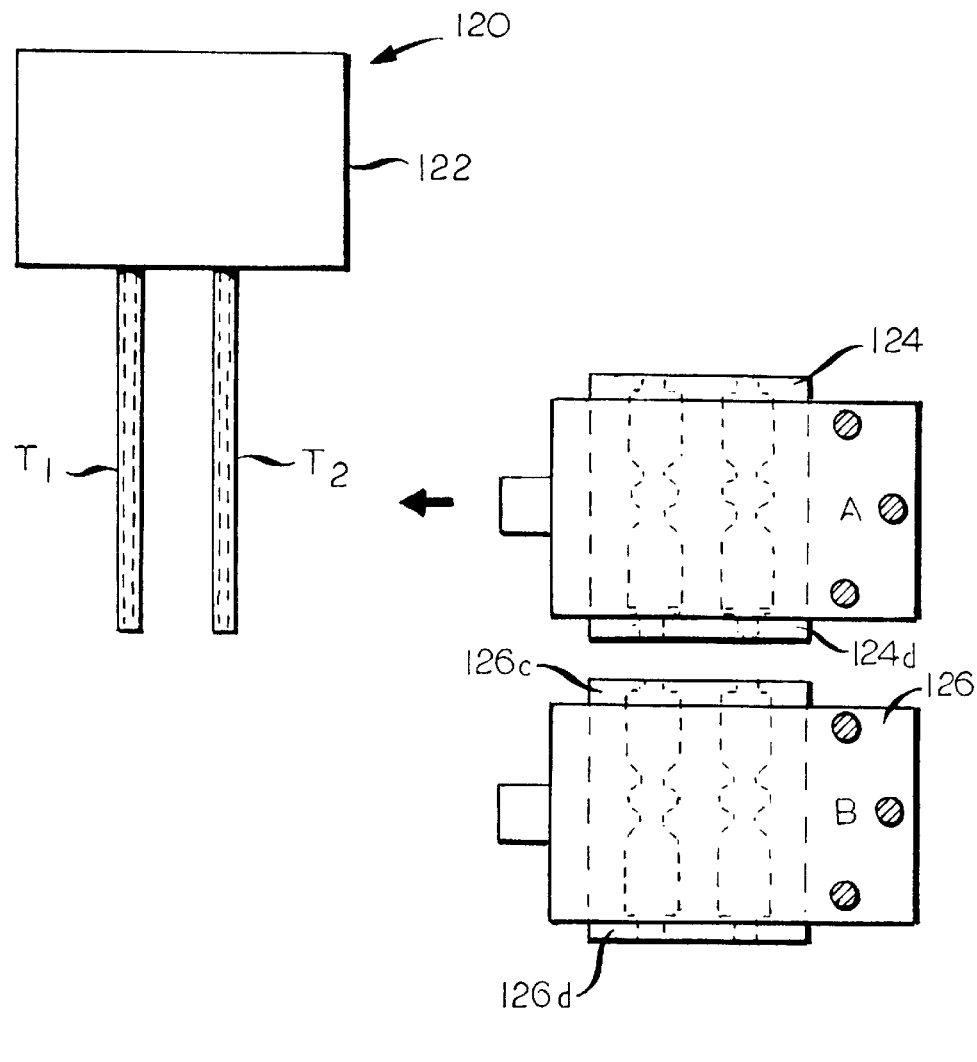
FIGS. 3–8 are schematic views illustrating a sequence of steps to be followed in producing tandem blow molded containers by apparatus generally corresponding to that of FIGS. 1 and 2.
Figure 4:
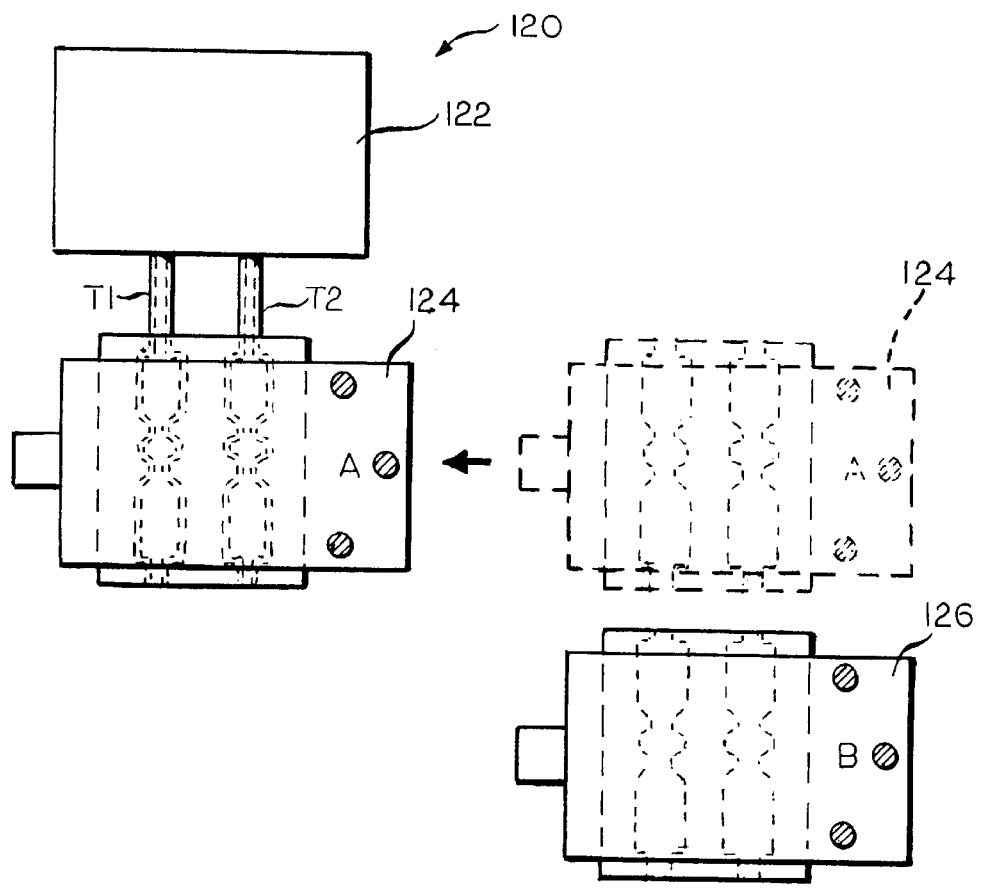
Figure 5:
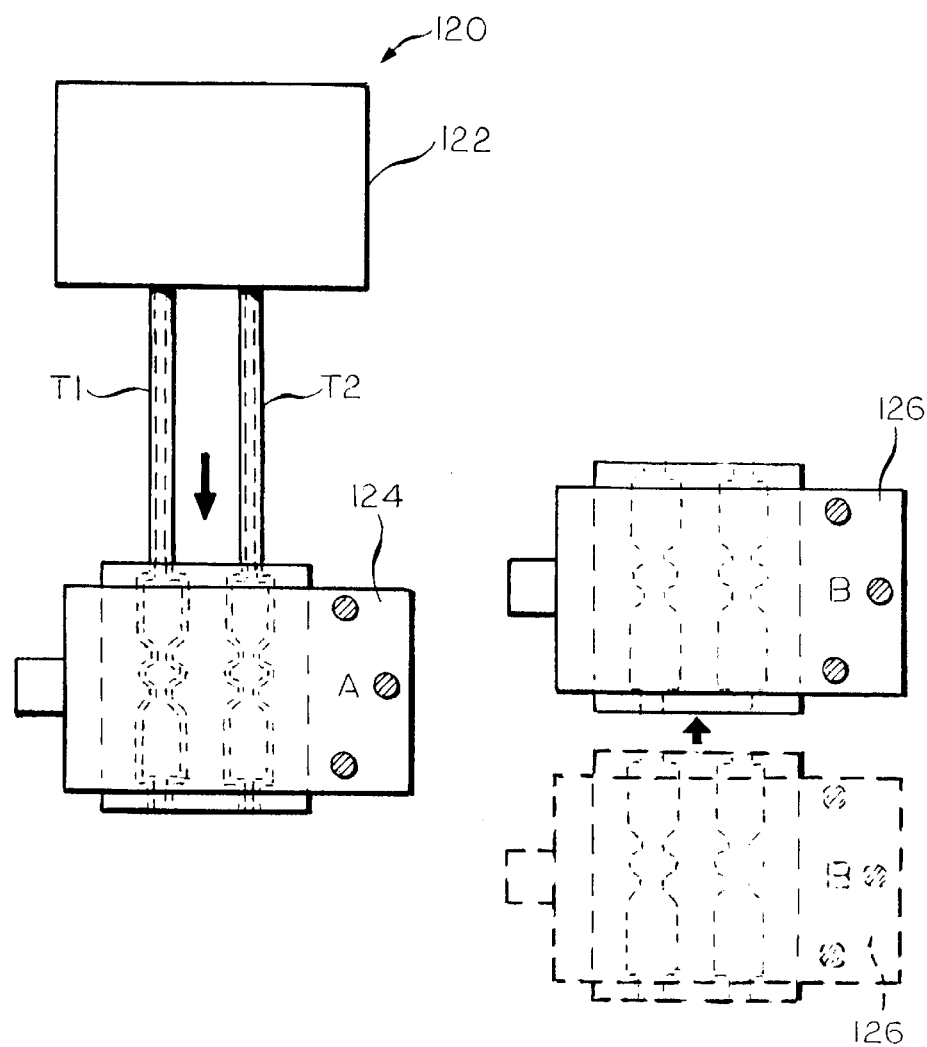
Figure 6:
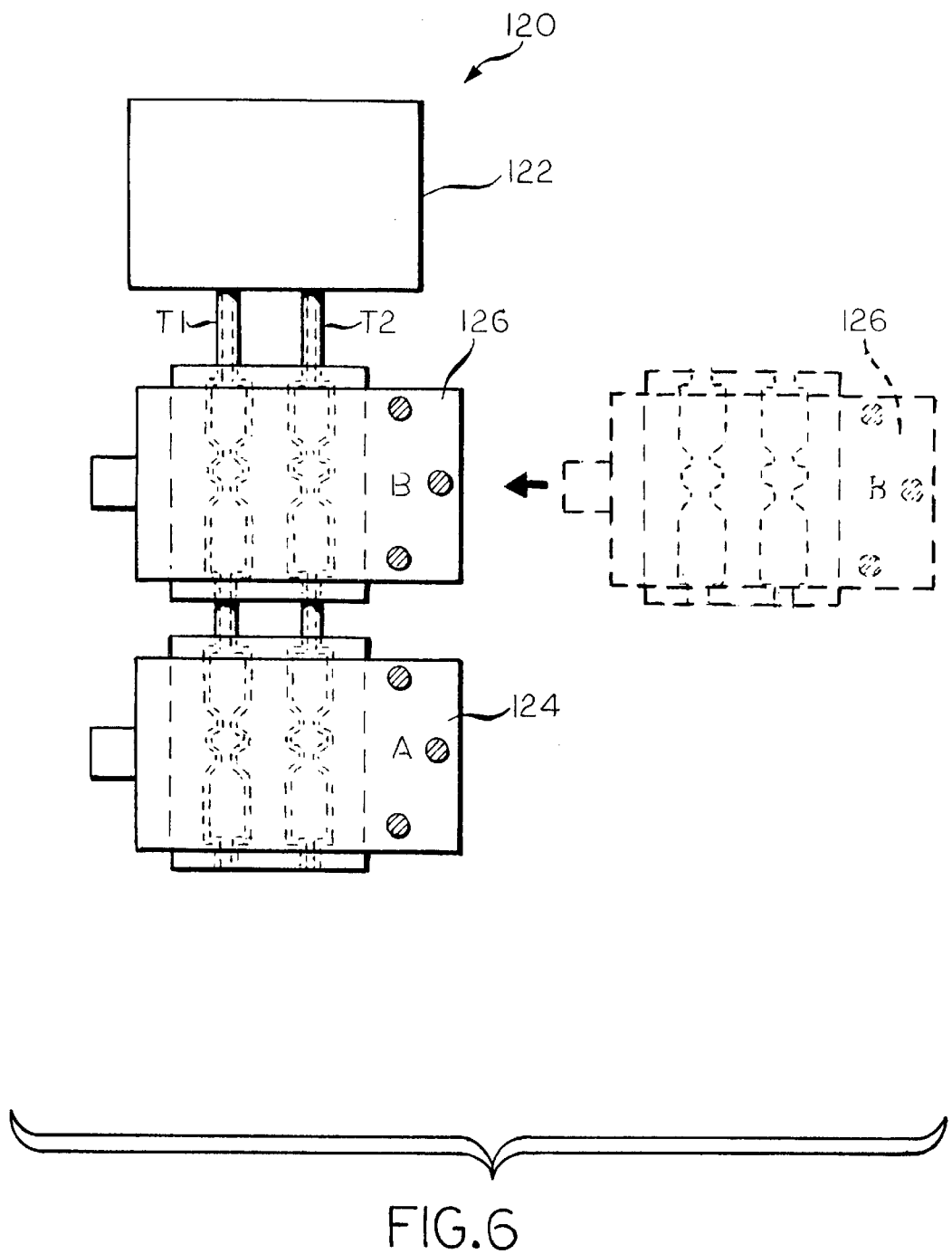
Figure 7:
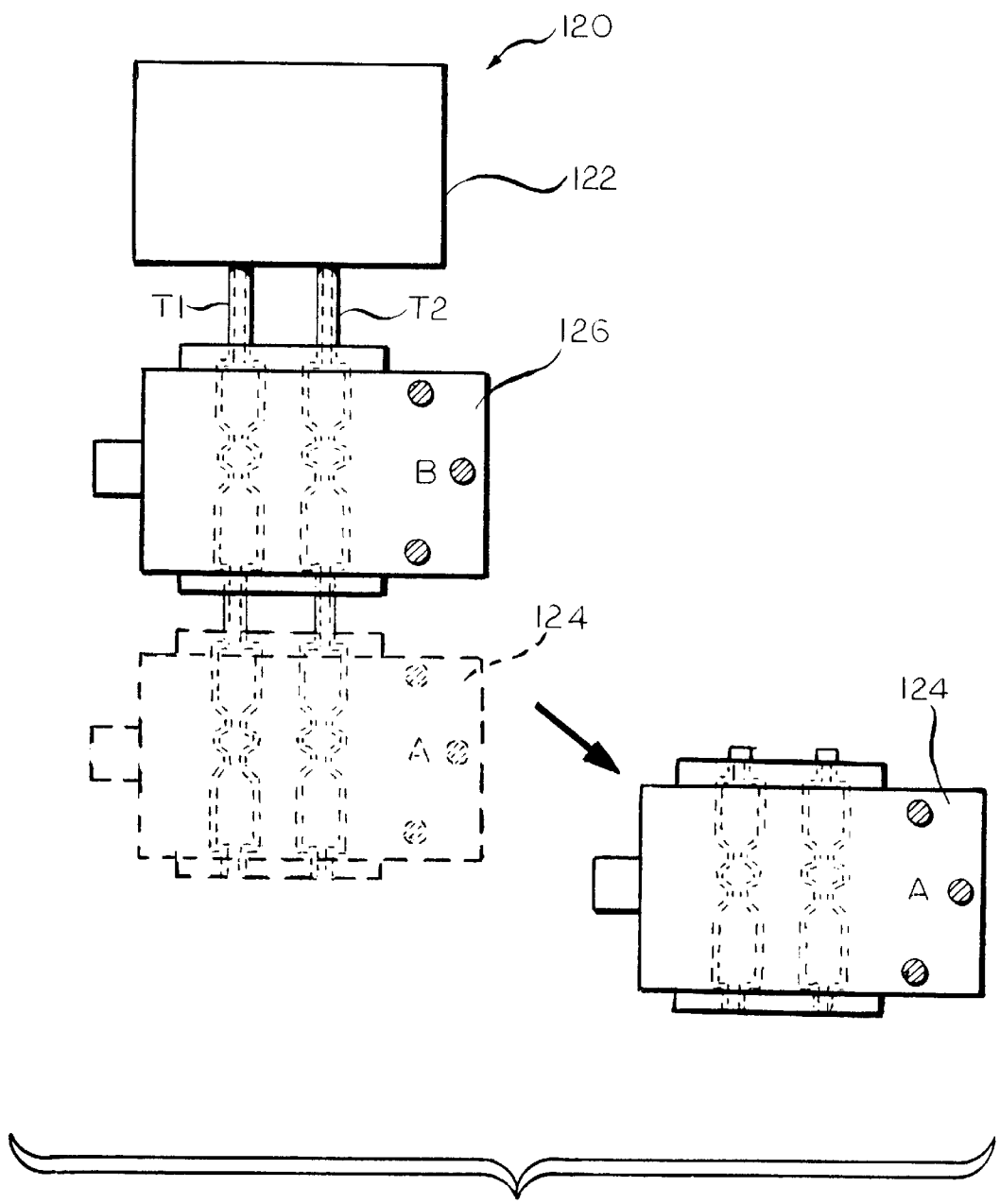
Figure 8:
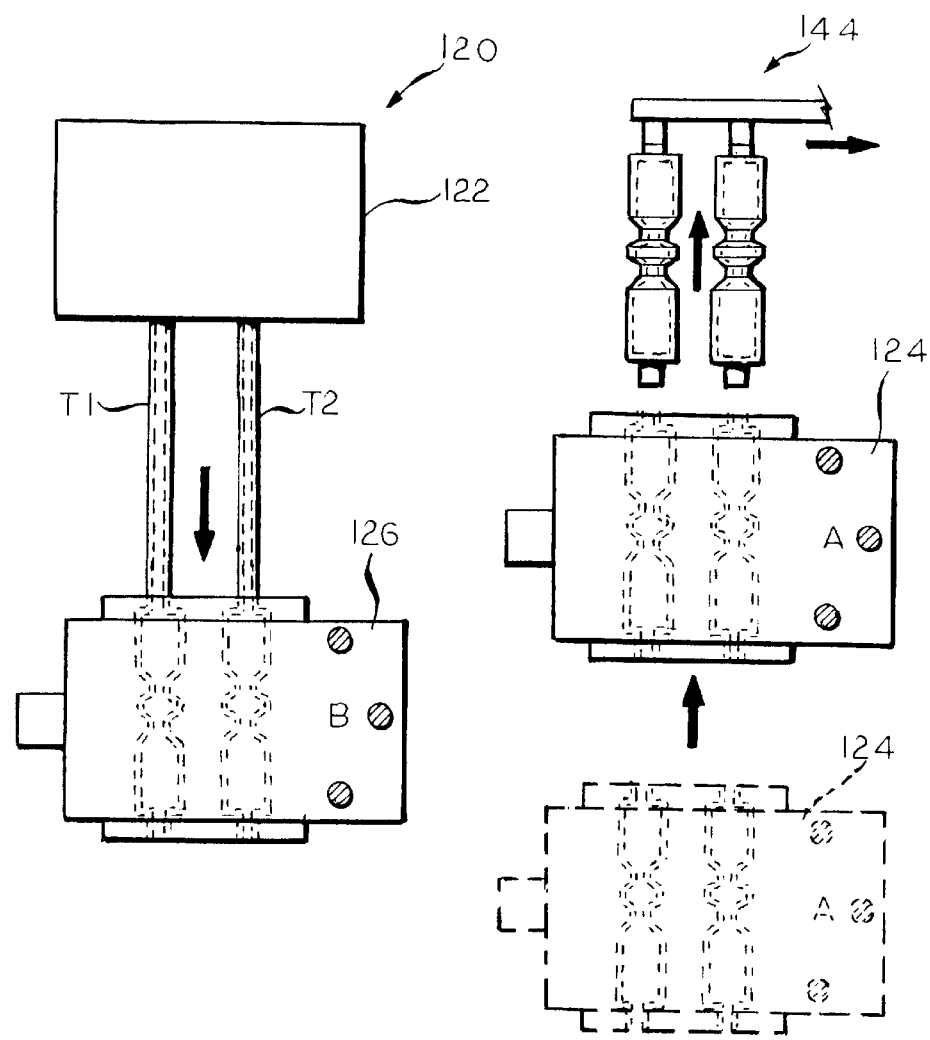

The motion cycle practiced by the apparatus 120 of FIGS. 3–8 may be considered to begin with the step that is illustrated in FIG. 3, wherein the mold set 124 is positioned at the higher of its two operating positions and out of alignment with the tubes T1 and T2, and the mold set 126 is positioned at the lower of its two operating positions and also out of alignment with the tubes T1 and T2. The next step in the cycle is the horizontal motion of the mold set 124 from the broken line position illustrated in FIG. 4 to a position in alignment with the tubes T1 and T2 to close on the tubes T1 and T2, and this is preferably done with the extruded tubes T1, T2 still engaged by the mold set 124 until the tubes T1, T2 are engaged by the mold set 126. Thereafter, as shown in FIG. 5, the mold set 124 is moved downwardly, to stretch the portions of the tubes T1, T2 thereabove, and the mold set 126 is moved from its broken line position to its solid line position immediately thereabove. Then, the mold set 126 is moved into a position in alignment with the tubes T1, T2, from its broken line position as illustrated in FIG. 6, to its solid line position in FIG. 6, and, the mold set 124 moves further downwardly to provide clearance for the mold set 126 to move into its position to engage the tubes T1, T2. Thereafter, as shown in FIGS. 7, the mold set 124 is moved from its position in alignment with the tubes T1, T2, as shown by the broken line position of the mold set 124 in FIG. 7, to a position out of alignment with the tubes T1, T2, and preferably slightly downwardly, as shown by the solid line position of the mold set 124 in FIG. 7. The downward motion of the mold set 124 in moving from its broken line position in FIG. 7 to its solid line position in FIG. 7 helps to sever the lengths of the tubes T1, T2 in the mold set 124 from the lengths of the tubes T1, T2 in the mold set 126. The next step in the cycle practiced by the apparatus 120 of FIGS. 3–8 is illustrated in FIG. 8, wherein the mold set 126 is moved downwardly, while still in alignment with the extruded tubes T1, T2, to stretch the portions of the tubes T1, T2 thereabove and to provide for clearance for the mold set 124 to be moved in to a position in alignment with the tubes T1, T2 for a repeat of the process. Simultaneously, the mold set 124 is moved from its lowermost position, as shown in broken line in FIG. 8, to its uppermost position, as shown in solid line in FIG. 8, and take-away equipment, which is indicated generally by reference numeral 144, is provided to remove blown articles from the mold set 124, before the mold set 124 is moved from its solid line position in FIG. 8 to its solid line position in FIG. 4.

In the embodiment of FIGS. 9–12, elements that correspond to the elements of the embodiment of FIGS. 1 and 2, or the embodiment of FIGS. 3–8, are identified by a 200 series numeral, the last two digits of which are the digits of the corresponding element of the embodiment of FIGS. 1 and 2, or the embodiment of FIGS. 3–8, as the case may be.

Shuttle blow molding apparatus according to the embodiment illustrated in FIGS. 9–12 is generally indicated by reference numeral 220. The apparatus 220 includes an extruder 222 that substantially continuously downwardly extrudes a spaced apart pair of tubes T1, T2 of thermoplastic material at a temperature sufficiently high to permit finite lengths of such tubes to be blown into containers or other useful hollow articles. The blowing of successive lengths of each of the tubes T1, T2 is done sequentially by a pair of mold sets 224, 226, which may be of conventional construction. The mold sets 224, 226, are mounted for vertical motion and horizontal motion independently of each other by means, not shown, which may be similar to that illustrated in FIGS. 1 and 2.

Figure 9:
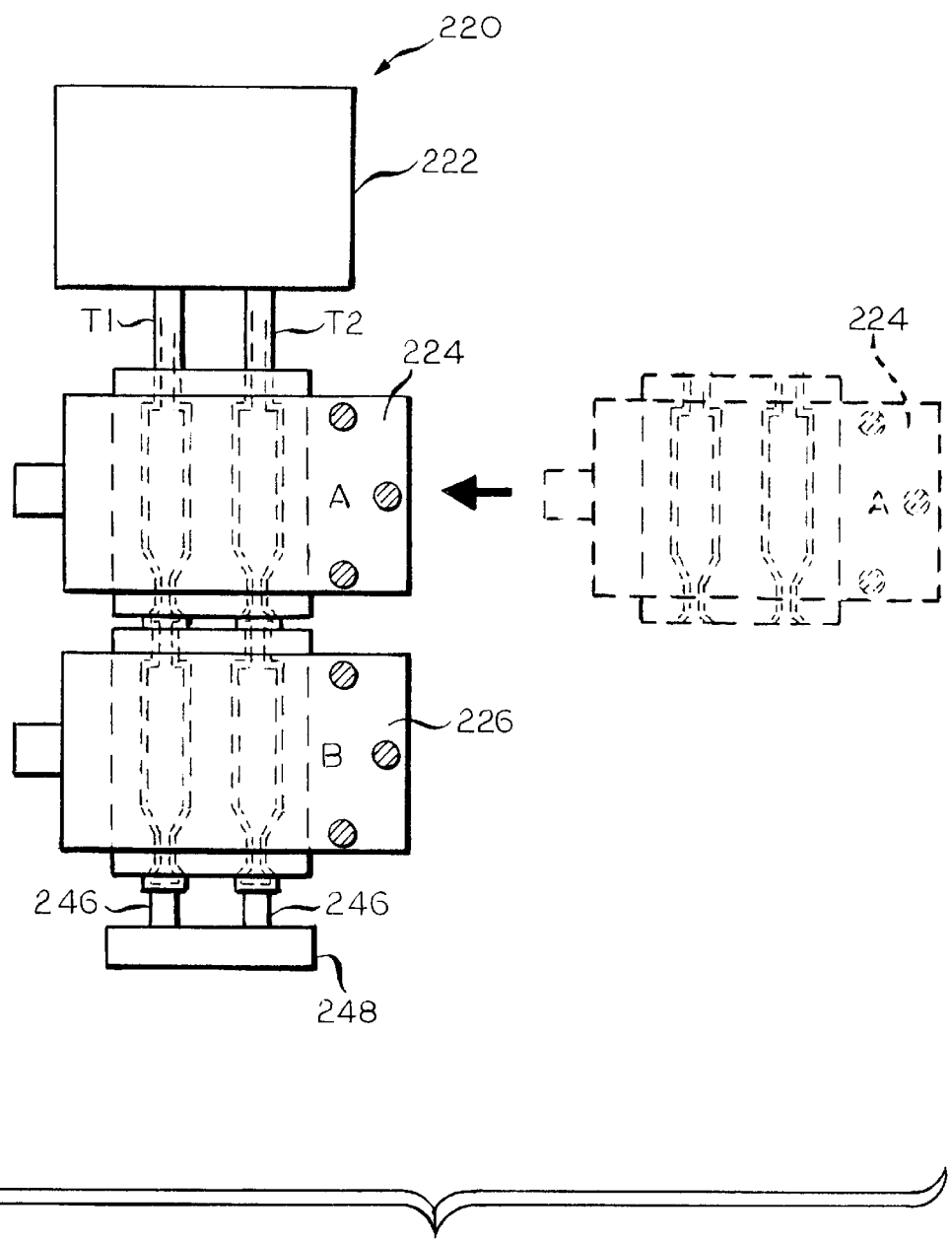
FIGS. 9–12 are schematic views illustrating a sequence of steps to be followed in producing blow molded containers with calibrated finishes by apparatus generally corresponding to that of FIGS. 1 and 2.

FIG. 9 illustrates a step in the process practiced by the apparatus of FIGS. 9–12 in which the mold set 224 has just moved horizontally from a position out of alignment with the tubes T1, T2, as shown in broken line, to a position in alignment with the tubes T1, T2, as shown in solid line. At this time, the mold set 226 has moved downwardly from the position now occupied by the mold set 224, causing a stretching of the tubes T1, T2, and movement of the articles in the mold 15 set into engagement with blow pins 246, which are carried by a blow air manifold 248. The blow pins 246 extend into the open ends of the articles in the mold set 226, and the open ends of such articles, which are conventionally called finishes, are molded against the exterior of the blow pins 246, to form very precisely calibrated finishes.

Figure 10:
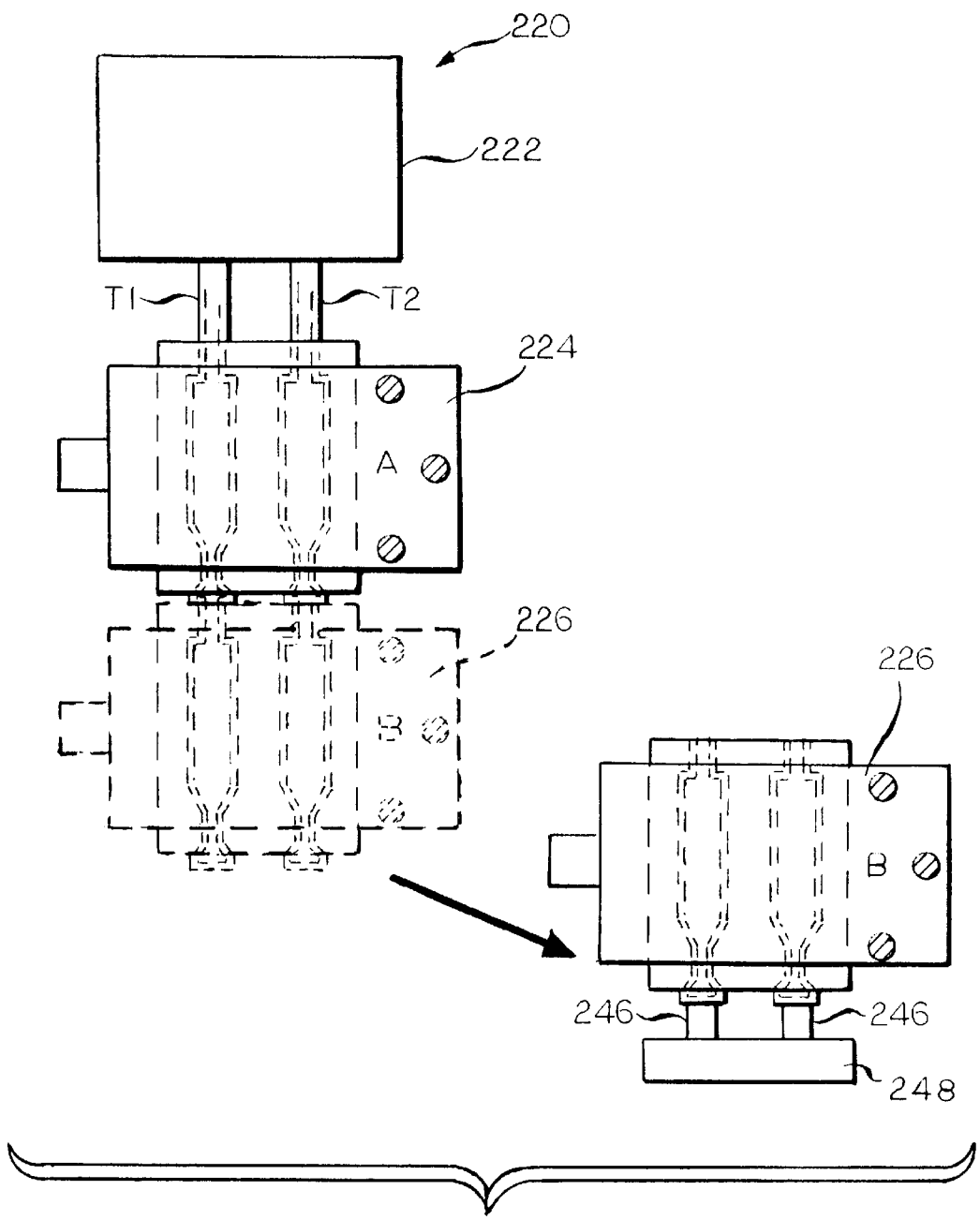

At the conclusion of the step illustrated in FIG. 9, the mold set 226 is moved, with the blow pins 246 and the blow air manifold 248, from the position illustrated in broken line in FIG. 10 outwardly and downwardly to the position illustrated in solid line in FIG. 10. The mold set 226 is then moved upwardly, still in engagement with the blow pins 246 to the position illustrated in FIG. 12, where the mold set 226 is now in position to be moved horizontally to engage finite lengths of tubes T1 and T2, the mold set 224 having been moved downwardly to stretch the extruded tubes T1 and T2 and to bring the open ends of the containers in the mold set 224, into engagement with another set of blow pins 246 that are carried by another blow air manifold 248.

Figure 11:
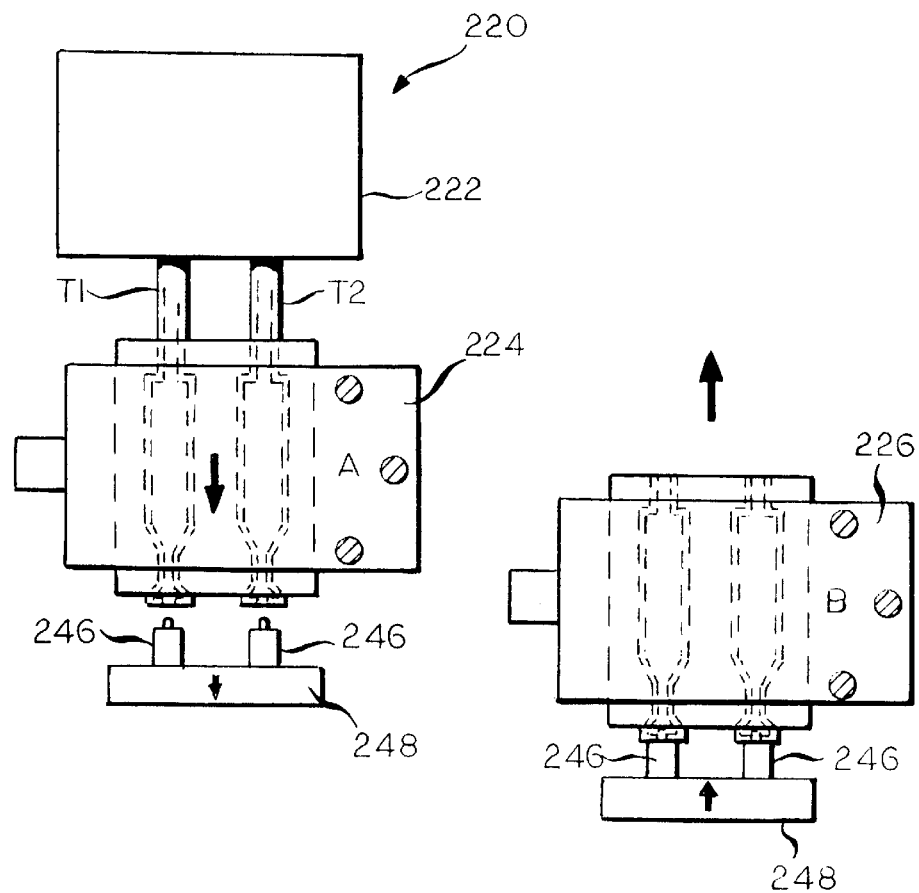
Figure 12:
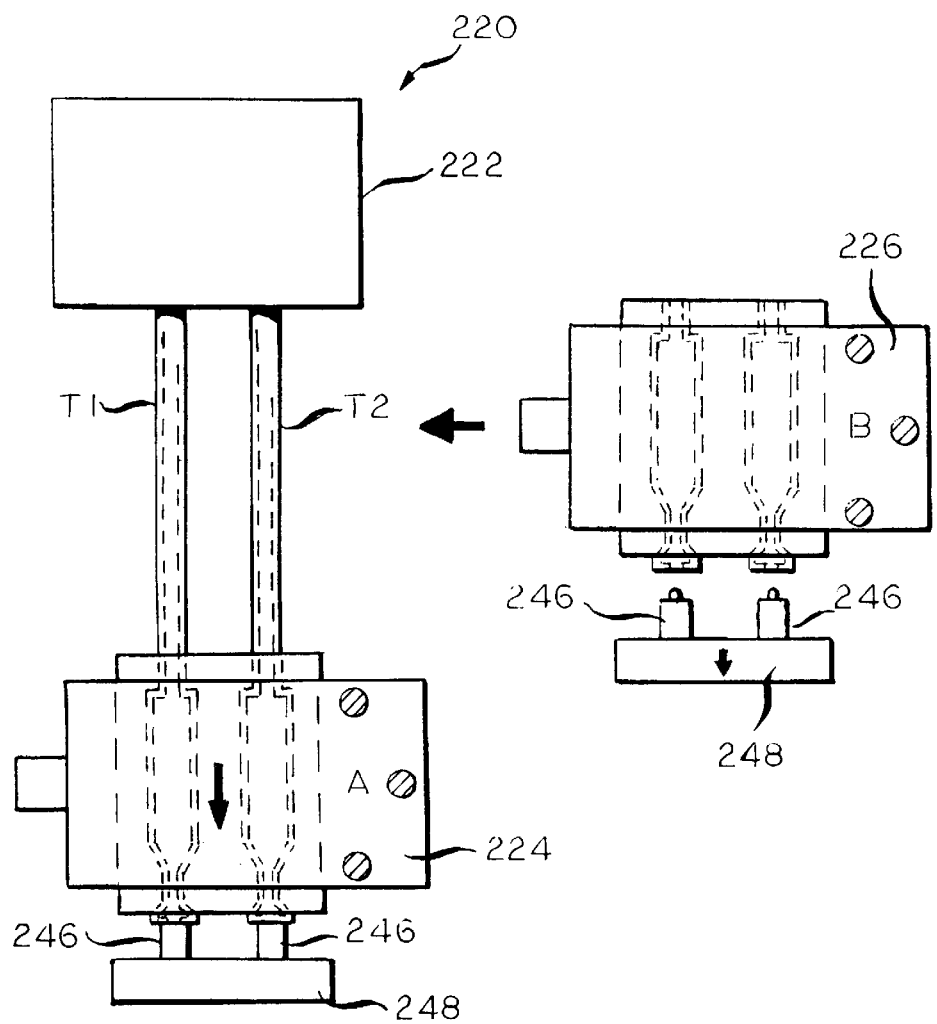
Figure 13:
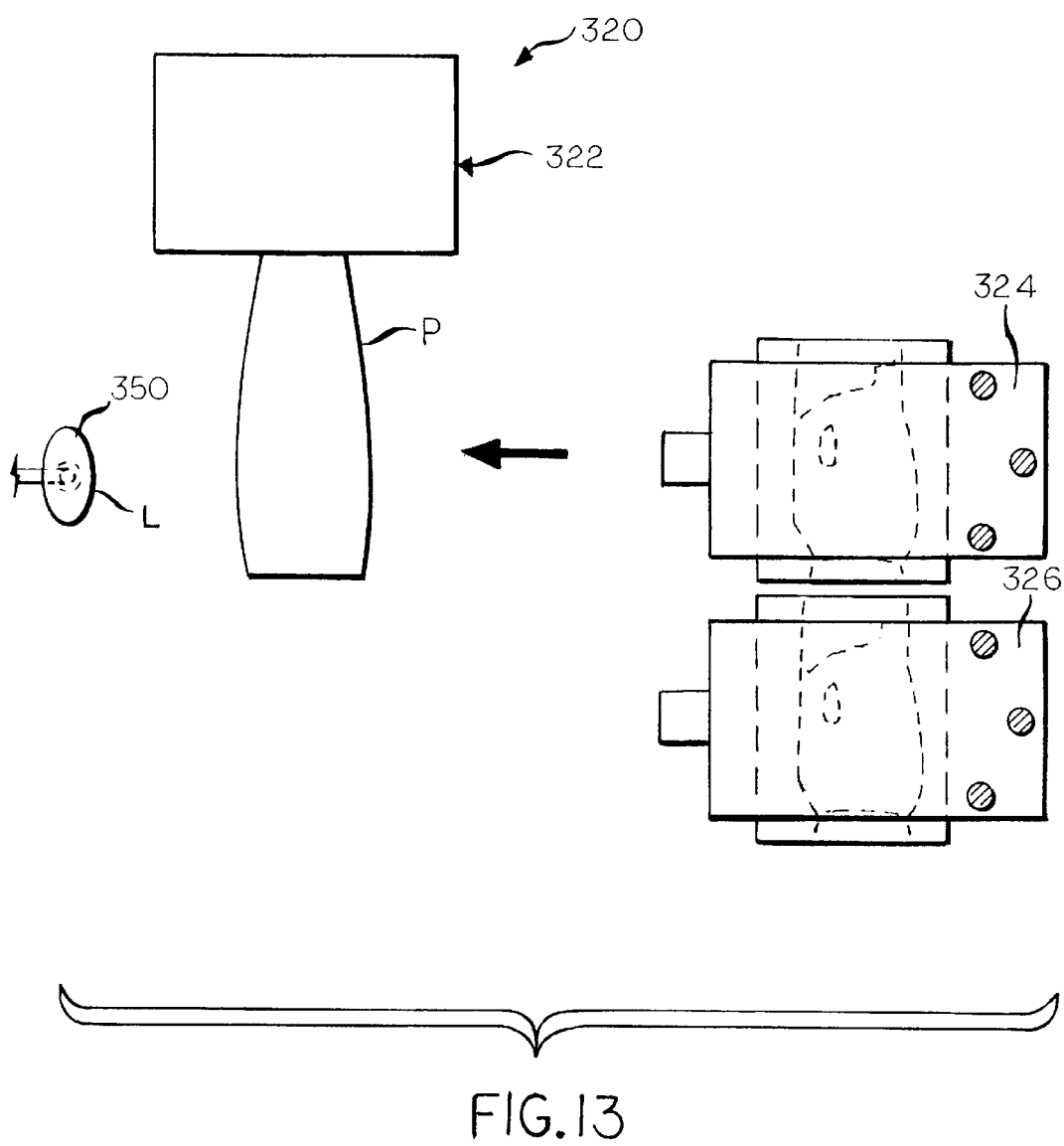
FIGS. 13–15 are schematic views illustrating a sequence of steps to be followed in producing large containers with handles and pre applied labels by apparatus generally corresponding to that of FIGS. 1 and 2.
Figure 14:
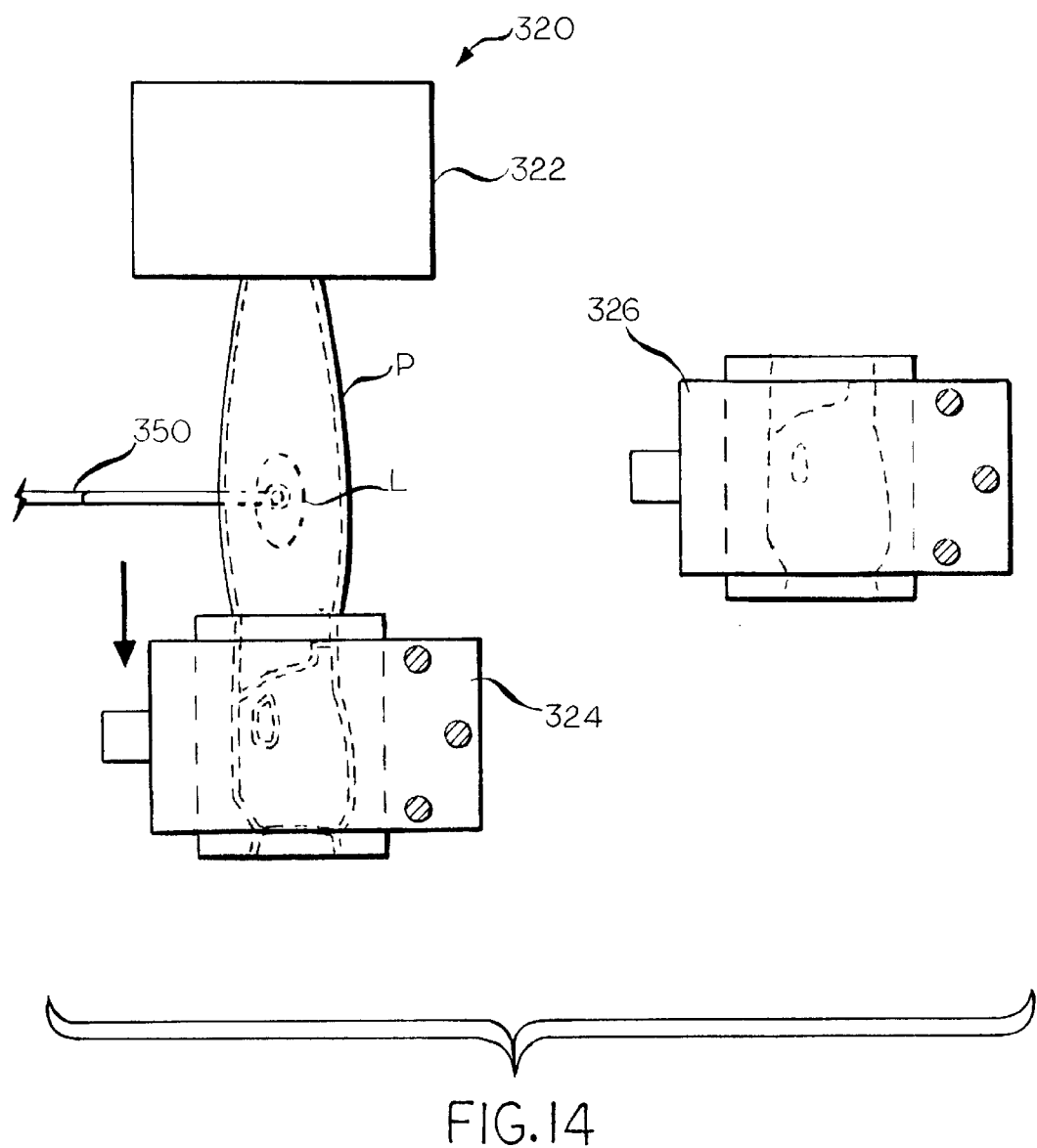
Figure 15:
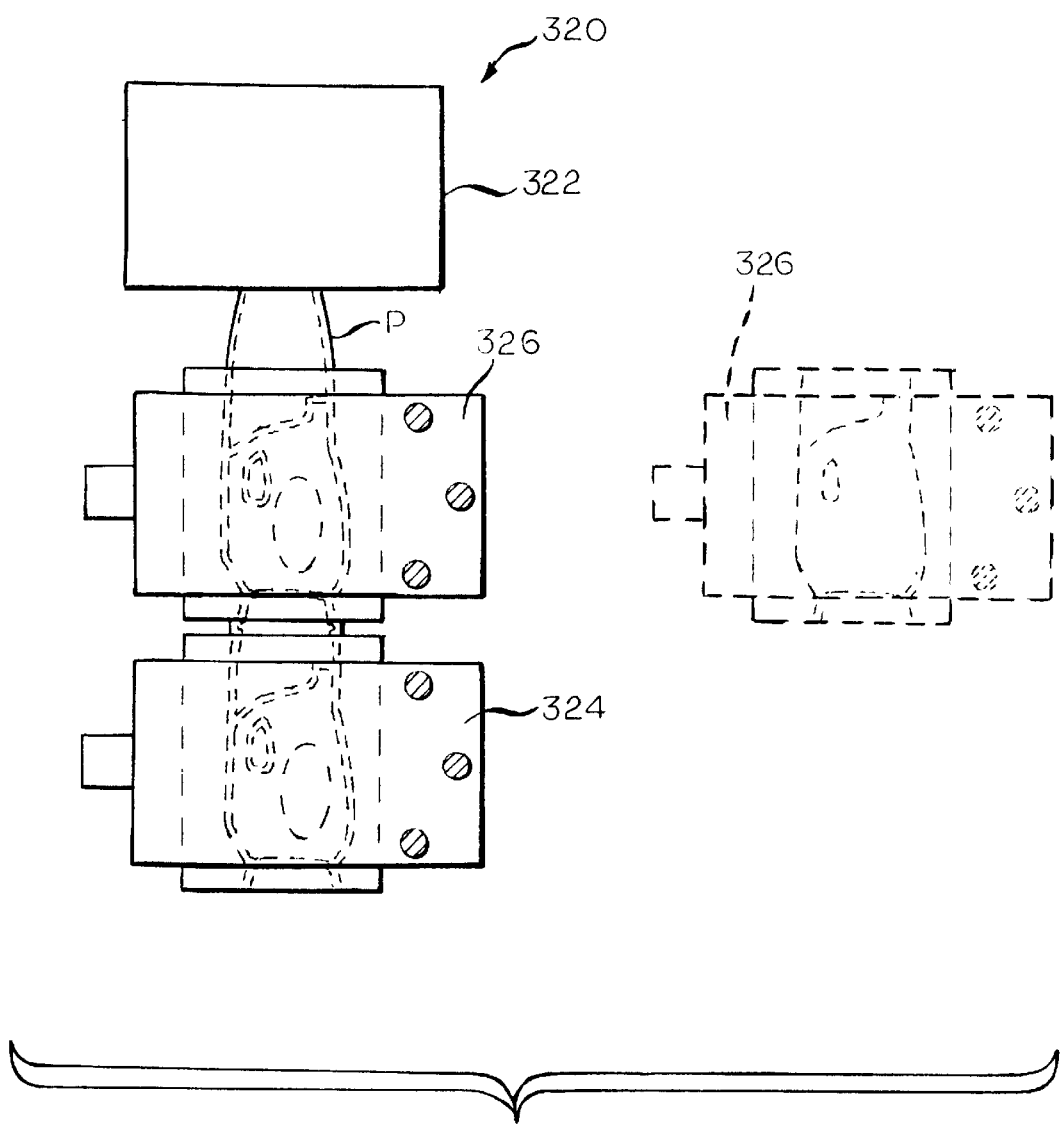

In the embodiment of the invention as illustrated in FIGS. 13–15, elements corresponding to the elements of the embodiment of FIGS. 1 and 2, or to the embodiment of FIGS. 3–8, or to the embodiment of FIGS. 9–11, are identified by a 300 series numeral, the last two digits of which are the two digits of the corresponding element of the invention of FIGS. 1 and 2, or the invention of FIGS. 3–8, or the invention of FIGS. 9–12, as the case may be.

Shuttle blow molding apparatus according to the embodiment of the invention that is illustrated in FIGS. 13–15 is indicated generally by reference numeral 320 in FIGS. 13–15. The apparatus 320 includes a blow head 322 that substantially continuously extrudes a series of parisons P from an extruded tube, the blow head 322 being an extruder with a source of compressed air leading thereinto to partially preblow the extruded tube into the parisons P1, and FIG. 13 illustrates a step in the cycle of operation of the embodiment of FIGS. 13–15 where a retractable in-mold labelling device 350 is being retracted after having applied a label L to an open mold set 324 or 326 that is positioned to engage a parison P that has just been emitted from the blow head 322. The mold set 324, which is out of vertical alignment with the blow head 322, is then moved horizontally to engage the parison P to move it downwardly from the blow head 322 and form a blow molded article, such as a handle container, therein. While the mold set 324 is being moved downwardly with respect to the blow head 322, another mold set 326 is moved upwardly from the position illustrated in FIG. 13, where it is positioned below the mold set 324, into the position previously occupied by the mold set 324, so that it is now in a position to move into alignment with the blow head 322 and engage another parison P, after the application of a label L to the interior of successor mold set by the in-mold labelling device 350. This condition of the apparatus 320 is illustrated in FIG. 14.

FIG. 15 illustrates a subsequent step in the operation of the apparatus 320 in which the mold set 326 has been moved into a position in alignment with the blow head 322, as shown by the solid line position of the mold set 326, from the position of the mold set 326 immediately prior thereto, which is illustrated in broken line.

Thus, in the embodiment of FIGS. 13–15, a plurality of labelled useful articles can be produced by apparatus having a plurality of mold sets with only a single set of in-mold labelling equipment, notwithstanding that there are a plurality of mold sets in which the articles are formed.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Apparatus for blow molding containers having a hollow shape from a thermoplastic material, said apparatus comprising:
    means for substantially continuously producing the hollow shape of the thermoplastic at an elevated, moldable temperature downwardly along a vertical axis;
    a first mold set, said first mold set having first and second mold halves that open and close relative to each other to define, when closed, at least one first mold cavity;
    a second mold set, said second mold set having a second set of mold halves that open and close relative to each other to define, when closed, at least one second mold cavity; and
    means for moving said first mold set and said second mold set, in sequence, in a vertical plane along a quadrilateral path to present each of said first mold set and said second mold set at a first position to engage, when open, a finite length of the thermoplastic material in each of said first mold set and said second mold set as said first mold set and said second mold set are moved along the quadrilateral path.

2. Apparatus according to claim 1 wherein the hollow shape is that of a series of parisons, and further comprising:
    a single in-mold labelling device positioned along the quadrilateral path to sequentially apply labels to each mold set before the parison is engaged by the first mold set or the second mold set, as the case may be.

3. The method of blow molding containers from a thermoplastic material comprising:
    substantially continuously extruding a thermoplastic material downwardly along a vertical axis;
    engaging a first finite length of the thermoplastic material in a first mold set at a first elevation of the first mold set;
    moving the first mold set downwardly;
    engaging a second finite length of the extruded thermoplastic material in a second mold set at an elevation above the elevation of the first mold set;
    moving the first mold set horizontally away from a position in alignment with the vertical axis;
    moving the second mold set downwardly;
    moving the first mold set upwardly and discharging blown articles from the first mold set;
    moving the second mold set out of alignment with the extruded thermoplastic preform; and
    moving the first mold set back to engage a third finite length of the thermoplastic material at an elevation above the elevation of the second mold set;
    wherein the second finite length of extruded thermoplastic material is engaged by the second mold set while the first finite length of extruded thermoplastic material is still engaged by the first mold set, and wherein the first finite length of extruded thermoplastic material is severed from the second finite length of extruded thermoplastic material by the moving of the first mold set horizontally away from the position in alignment with the vertical axis.

4. The method according to claim 3 and further comprising:
    applying labels, in sequence, to interiors of the first mold set and the second mold set, each label being applied to a thermoplastic preform after the thermoplastic preform is engaged by one of the first mold set and the second mold set.

5. The method according to claim 3 wherein the first mold set is also moved downwardly during the movement of the first mold set horizontally to aid in severing of the first finite length of extruded thermoplastic material from the second finite length of thermoplastic material.

6. The method according to claim 3 and further comprising:
    removing blown containers from the first mold set while the first mold set is in a position out of vertical alignment with the vertical axis; and
    thereafter removing blown containers from the second mold set while the second mold set is in the position and after the first mold set has been moved back to engage the third finite length of thermoplastic material.

7. The method according to claim 6 wherein the position is horizontally aligned with a second position at which the first mold set engages the third finite length of thermoplastic material.

8. The method according to claim 3 in which the third finite length of extruded thermoplastic material is engaged by the first mold set while the second finite length of thermoplastic material is engaged by the second mold set, and wherein the second finite length of thermoplastic material is severed from the first finite length of thermoplastic material by the moving of the second mold set horizontally away from the position in alignment with the vertical axis.

9. The method according to claim 8 wherein the second mold set is also moved downwardly during the movement of the second mold set horizontally to aid in severing of the second finite length of extruded thermoplastic material from the third finite length of thermoplastic material.

\* \* \* \* \*